United States Patent [19]

Ukihashi et al.

[11] 3,893,971

[45] July 8, 1975

[54] STABILIZED ETHYLENE-TETRAFLUOROETHYLENE COPOLYMER COMPOSITION

[75] Inventors: Hiroshi Ukihashi; Masaaki Yamabe, both of Tokyo; Hiromichi Nishimura; Haruhisa Miyake, both of Yokohama, all of Japan

[73] Assignee: Asahi Glass Company, Ltd., Tokyo, Japan

[22] Filed: Dec. 26, 1973

[21] Appl. No.: 428,414

[30] Foreign Application Priority Data
Dec. 25, 1972  Japan.............................. 47-129387

[52] U.S. Cl... 260/45.7 R; 260/42.27; 260/45.75 R; 260/87.5 B
[51] Int. Cl. ............................................ C08f 45/56
[58] Field of Search ..... 260/42.27, 45.7 R, 45.75 R, 260/87.5 B

[56] References Cited
UNITED STATES PATENTS

| | | | |
|---|---|---|---|
| 2,468,664 | 4/1949 | Hanford et al..................... | 260/87.5 |
| 2,737,505 | 3/1956 | Finholt............................. | 260/45.75 |
| 3,060,098 | 10/1962 | Gershon............................... | 51/309 |
| 3,121,623 | 2/1964 | Nesin..................................... | 51/293 |
| 3,190,864 | 6/1965 | Shipp et al......................... | 260/92.1 |

*Primary Examiner*—Melvyn I. Marquis
*Attorney, Agent, or Firm*—Oblon, Fisher, Spivak, McClelland & Maier

[57] ABSTRACT

Ethylene-tetrafluoroethylene copolymer compositions are stabilized against thermal degradation so as to render them melt-processable by imcorporating therein 0.001 to 5 weight percent of $\alpha$-alumina, based on the weight of copolymer in the compositions.

5 Claims, No Drawings

STABILIZED ETHYLENE-TETRAFLUOROETHYLENE COPOLYMER COMPOSITION

BACKGROUND OF THE INVENTION

1. Field of the Invention

This invention relates to a stabilized ethylene-tetrafluoroethylene copolymer composition which is melt-processable, and more particularly, this invention relates to an ethylene-tetrafluoroethylene copolymer which is stabilized against degradation during fabrication and use at elevated temperatures. This invention also relates to a process for preparing the stabilized compositions.

2. Description of the Prior Art

It is known that ethylene-tetrafluoroethylene copolymers have excellent thermal, chemical, electrical and mechanical properties and are melt-processable. These copolymers are known to be heat resistant resins. However, under atmospheric conditions and at temperatures near their decomposition points, e.g. at higher than 310°C, the conventional ethylene-tetrafluoroethylene copolymers become slightly colored after about 1 hour. Not only do they become reddish brown in color but the coloring is accompanied by foaming.

The undesirable coloration and foaming of the conventional ethylenetetrafluoroethylene copolymers is a particularly significant disadvantage since many applications of these copolymers are at sufficiently high temperatures to cause such thermal decomposition. Also, when a molding apparatus is used to form molded articles of these copolymers, the molding temperatures may exceed 310°C for a sufficient time to cause thermal decomposition which disrupts the molding process.

A need therefore exist for a thermally stable ethylene-tetrafluoroethylene copolymer which is melt-processable and does not suffer from the above described disadvantages.

SUMMARY OF THE INVENTION

Accordingly, one object of this invention is to provide a process for improving the thermal stability of an ethylene-tetrafluoroethylene copolymer.

Another object of this invention is to provide a melt-processable composition comprising an ethylene-tetrafluoroethylene copolymer and a stabilizer therefore.

Yet another object of this invention is to provide a melt-processable composition comprising an ethylene-tetrafluoroethylene which is resistant to thermal degradation on prolong exposure at an elevated temperature.

Briefly, these and other objects of the invention as hereinafter will become apparent are achieved by intimately dispersing a small amount of α-alumina in the ethylene-tetrafluoroethylene copolymer.

DETAILED DESCRIPTION OF THE PREFERRED EMBODIMENTS

The composition of this invention has a high thermal stability without coloring or foaming upon exposure of the composition to a temperature of higher than about 310°C under atmospheric conditions for about 3 hours.

Moreover, the addition of a small amount of α-alumina to the copolymer does not adversely affect the physical and electrical properties and melt-processability of these copolymers.

In this invention, it is important that α-alumina is combined with the copolymer. Other metal oxides such as γ-alumina, titanium oxide, magnesium oxide, zinc oxide, tin oxide, calcium oxide, or the like impart a slight thermal stabilization effect against decomposition of the copolymer, and in some cases, the metal oxide reduces the thermal stability of the copolymer.

The type of α-alumina used in the invention is not particularly limited, however, it is preferable to optimize the particle size, the specific surface area, particle distribution or the like of the α-alumina depending on the desired properties of the copolymer composition. For example, it is preferable to use an α-alumina having a relatively small particle diameter which is usually less than $100\beta$ and preferably about $1 - 50\beta$. It is also preferable to have a sharp particle distribution. The specific surface area of the α-alumina is from about $0.1 - 30 \text{ m}^2/\text{g}$ and preferably from about $0.5 - 5\text{m}^2/\text{g}$. When the particle diameter and specific surface area of the α-alumina is not included within the above ranges, disadvantages result which decrease the improvement in the thermal stability, the surface smoothness of a processed article made of the composition, and the uniform compatibility of the α-alumina and the ethylene-tetrafluoroethylene copolymer α-Alumina is preferably prepared by calcination at a temperature higher than 900°C and preferably higher than 1000°C.

The amount of α-alumina added is usually from about 0.001 − 5 wt.% and preferably from 0.005 − 3 wt.% based on the weight of ethylene-tetrafluoroethylene copolymer. When the amount of α-alumina is too small, the improvement in thermal stability does not result and when the amount of α-alumina is too large, the mold processability, that is, the fluidity of the ethylene-tetrafluoroethylene copolymer is decreased and mold processed article is cloudy and does not possess the excellent properties of the copolymer.

The ethylene-tetrafluoroethylene copolymers used in the invention can be prepared by various well known polymerization methods such as a catalytic emulsion polymerization in an aqueous medium, a suspension polymerization; catalytic solution polymerization; vapor polymerization; radioactive irradiation polymerization, or the like.

The ratio of ethylene to tetrafluoroethylene in the copolymer may vary over wide limits. For example, the molar ratio of tetrafluoroethylene to ethylene may be from 40/60 to 70/30 preferably from about 45/55 to 60/40. It is preferable to use copolymers having a volumetric melt flow rate of $10 - 300 \text{ mm}^3/\text{sec.}$, preferably from $20-160 \text{ mm}^3\text{sec}$. The volumetric melt flow rate used in the specification is defined as follows: 1 g of a sample of the copolymer is extruded through a nozzle having a diameter of 1 mm and a round of 2 mm under a predetermined pressure of $30 \text{ kg/cm}^2$ at a predetermined temperature by using a Flow tester. The volume of the molten sample extruded per unit time is shown as the volumetric melt flow rate and the unit is $\text{mm}^3/\text{sec}$. The predetermined temperature can be the temperature range at which the ethylene-tetrafluoroethylene copolymer is moldable. That is, a temperature range between the temperature at which melt flow begins and the temperature at which thermal decomposition begins and it is near the temperature at which melt flow begins, i.e. the fluid initiation temperature.

The predetermined temperature is selected from 260° – 360°C for ethylene-tetrafluoroethylene copolymer. The temperature used to measure the volumetric melt flow rate is lower than the temperature at which thermal decomposition of the copolymer begins.

Small amounts of a comonomer such as propylene, isobutylene, vinylfluoride, hexafluoropropylene, chlorotrifluoroethylene, acrylic acid, acrylic acid alkyl esters, chloroethyl vinyl eter, perfluorovinyl ether, or the like and a modifier may be added to the tetrafluoroethylene-ethylene copolymer.

The copolymers of this invention have excellent heat resistance, chemical resistance, electrical properties, mechanical properties and also mold processability under heat-melting.

It is also possible to add suitable reinforcing agents, fillers, lubricants, pigments, or the like to the copolymer composition of the invention. The addition of the additives can improve the surface hardness, mechanical strength, abrasion resistance and other properties of the copolymer composition.

The method of addition and mixing of the $\alpha$-alumina is not particularly limited, however, it is preferable to use a method which uniformly mixes the ethylene tetrafluoroethylene with the $\alpha$-alumina. For example, $\alpha$-alumina may be crushed into particles having a particle diameter and particle distribution with the aforementioned ranges and mixed with the ethylene-tetrafluoroethylene copolymer or ethylene-tetrafluoroethylene copolymer may be crushed and mixed or it may be used in a molten state. It is also possible to disperse the ethylene-tetrafluoroethylene copolymer in an aqueous medium or an organic medium and then to mix it with $\alpha$-alumina by a wet mixing method.

The composition of the invention can be used for preparing various types of molded articles by various processing methods, and it can be applied to various applications in various uses. For example, the copolymer composition may be used for press molding, extrusion molding, injection molding, a lining, a coating, a wire coating, or the like.

The optimum ethylene-tetrafluoroethylene copolymers have a temperature at which melt flow begins of about 260° – 300°C and a temperature at which thermal decomposition begin of about 320° – 360°C. The melting temperature of the copolymer is selected to be between the temperature at which melt flow begins and the temperature at which thermal decomposition begins and is usually from about 260° – 360°C.

The compositions of this invention have an improved thermal stability, and may most advantageously be used in mold processing processes using a hot melt. For example, an ethylene-tetrafluoroethylene copolymer having a thermal decomposition temperature of about 345°C (without $\alpha$-alumina) can be improved to have a thermal decomposition of about 370°C, by adding 0.1 wt.% of $\alpha$-alumina.

Accordingly, it is possible to heat the composition at higher temperature than that of the copolymer having no $\alpha$-alumina whereby the processability of the mold processing is greatly improved.

Having generally described this invention a further understanding can be obtained by reference to certain specific examples, which are included for purposes of illustration only and are not intended to be limiting unless otherwise specified.

EXAMPLE 1

100 parts of wt. of a ethylene-tetrafluoroethylene copolymer (having a molar ratio of tetrafluoroethylene to ethylene of 52 to 48, a fluid initiation temperature of 279°C, a temperature at which thermal decomposition begins of 345°C and a volumetric melt flow rate of 46 mm$^3$/sec. at 300°C) was admixed with 0.1 part by wt. of $\alpha$-alumina having an average particle diameters of 5$\mu$. The resulting composition was press-molded at 300°C to form a sheet. The sheet was exposed to the atmosphere at 310°C for 3 hours. No coloring or foaming was observed. On the other hand, when $\alpha$-alumina was not admixed, the copolymer developed color after 1 hour exposure and became reddish brown in color after 3 hours with foaming.

EXAMPLE 2

The process EXAMPLE 1 was followed to prepare a sheet except that 0.01 wt.% of $\alpha$-alumina having particle diameter of 2$\mu$ was used. The sheet was exposed to the atmosphere at 310°C for 2.5 hours. No coloring or foaming was observed.

EXAMPLE 3 AND REFERENCES 1 – 4

The ethylene-tetrafluoroethylene copolymer of EXAMPLE 1 was admixed with 0.1 wt.% of each of $\alpha$-alumina (average particle diameter of 16$\mu$), $\alpha$-alumina, zinc oxide, magnesium oxide, or calcium oxide to prepare each composition.

The composition was pressed at 300°C to prepare sheet.

The results of thermal stability tests on the sheets are shown in Table 1. Coloring and foaming were observed when the metal oxides other than $\alpha$-alumina were used.

TABLE I

| | Additive | Appearance after heating at 310°C for 2 hours |
|---|---|---|
| Example 3 | $\alpha$-Al$_2$O$_3$ | no change |
| Ref. 1 | $\gamma$-Al$_2$O$_3$ | surface roughness and black brown color |
| Ref. 2 | ZnO | black gray color |
| Ref. 3 | MgO | reddish brown color surface foams |
| Ref. 4 | CaO | reddish brown color surface foams |

EXAMPLE 4

An ethylene-tetrafluoroethylene copolymer (having a molar ratio of tetrafluoroethylene to ethylene of 52 to 48 and a small amount of hexafluoropropylene) (volumetric melt flow rate of 96 mm$^3$/sec. at 300°C) was admixed with 0.1 wt.% of $\beta$-alumina (average particle diameter of 2$\mu$) by kneading copolymers and $\beta$-alumina.

The resulting composition was press-molded to form a sheet. The sheet was exposed to the atmosphere at 310°C for 2.5 hours. No coloring or foaming was observed.

EXAMPLES 5 – 7

The ethylene-tetrafluoroethylene copolymer of EXAMPLE 4 was admixed with varying amounts of $\beta$-alumina having an average particle diameter of 2$\mu$ by kneading the mixture of $\alpha$-alumina and copolymer. The resulting compositions was press-molded at 300°C to form a sheet. The sheet was exposed to the atmosphere at 310°C for 2.5 hours. The amount of α-alumina added and the appearance of the sheets are shown in Table II.

TABLE II

|  | Amount of -alumina (wt.%) | Temperature at which thermal decomposition begins | Appearance after heating at 310°C for 2.5 hours |
| --- | --- | --- | --- |
| Reference | 0 | 345 | Reddish brown, foams |
| Example 5 | 0.02 | 353 | foams |
| Example 6 | 0.8 | 381 | No change, no |
| Example 7 | 2.0 | 385 | no color or foam |

EXAMPLE 8

An ethylene-tetrafluoroethylene copolymer (having a molar ratio of tetrafluoroethylene to ethylene of 53 to 47 and a small amount of hexafluoropropylene) (volumetric melt flow rate of 52 mm³/sec. at 300°C) was admixed and kneaded with 0.05 wt.% of α-alumina having an average particle diameter of 1μ.

The resulting composition was press-molded at 300°C to form a sheet, which has a tensile strength of 540 kg/cm² and an elongation of 400%. The sheet was exposed to the atmosphere at 320°C for 1.5 hours. No coloring or foaming was observed.

On the other hand, when α-alumina was not added, the sheet has a tensile strength of 450 kg/cm² and an elongation of 420% and the sheet was colored by exposing to the atmosphere at 320°C and was changed to reddish brown with foam after 1.5 hours.

EXAMPLE 9

The sheet of EXAMPLE 8 containing α-alumina was kept at 230°C for 200 hours exposed to the atmosphere. The thus exposed product has an elongation of 410% at room temperature and showed no thermal degradation.

On the other hand, when α-alumina was not added, the elongation was decreased from 420% to 150%, clearly indicating the thermal degradation of the sheet.

EXAMPLE 10

An ethylene-tetrafluoroethylene copolymer (having a molar ratio of tetrafluoroethylene to ethylene of 53 to 47 and a small amount of hexafluoropropylene)(volumetric melt flow rate of 25 and 80 mm³/sec. at 300°C) was admixed by kneading with 0.05 wt.% of α-alumina having average particle diameter of 2μ.

The resulting composition was press-molded at 300°C to form a sheet. The sheet was exposed to the atmosphere at 310°C for 2 hours. No coloring or foaming was observed.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. An ethylene-tetrafluoroethylene copolymer composition having improved thermal stability, which comprises:

an admixture of an ethylene-tetrafluoroethylene copolymer, wherein the mold ratio of tetrafluoroethylene to ethylene is 40 – 70/60 – 30 and from 0.001 to 5 wt. % of α-alumina, based on the weight of the copolymer.

2. The composition of claim 1, wherein the copolymer has a volumetric melt flow rate of about 10 – 300 mm³/sec.

3. The composition of claim 1, wherein the copolymer has a flow initiation temperature of 260° –300 °C and a thermal decomposition temperature of 320° – 360°C.

4. The composition of claim 1, wherein the α-alumina has an average particle diameter of less than 100μ and a specific surface area from 0.5 – 5 ²/g.

5. The composition of claim 1, wherein the α-alumina is calcined at a temperature higher than about 900°C.

* * * * *